United States Patent
Zirwas et al.

(10) Patent No.: US 12,238,750 B2
(45) Date of Patent: Feb. 25, 2025

(54) EFFICIENT BEAM MANAGEMENT FOR WIRELESS NETWORKS

(71) Applicant: NOKIA TECHNOLOGIES OY, Espoo (FI)

(72) Inventors: Wolfgang Zirwas, Munich (DE); Mihai Enescu, Espoo (FI); Youngsoo Yuk, Seoul (KR); Rakash Sivasiva Ganesan, Unterhaching (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 404 days.

(21) Appl. No.: 17/756,024

(22) PCT Filed: Nov. 13, 2020

(86) PCT No.: PCT/IB2020/060678
§ 371 (c)(1),
(2) Date: May 13, 2022

(87) PCT Pub. No.: WO2021/094985
PCT Pub. Date: May 20, 2021

(65) Prior Publication Data
US 2022/0408446 A1  Dec. 22, 2022

Related U.S. Application Data

(60) Provisional application No. 62/935,610, filed on Nov. 14, 2019.

(51) Int. Cl.
*H04W 72/54*  (2023.01)
*H04W 24/08*  (2009.01)
*H04W 72/044* (2023.01)

(52) U.S. Cl.
CPC ........... *H04W 72/54* (2023.01); *H04W 24/08* (2013.01); *H04W 72/046* (2013.01)

(58) Field of Classification Search
CPC ... H04W 72/54; H04W 24/08; H04W 72/046; H04W 24/10
See application file for complete search history.

(56) References Cited

U.S. PATENT DOCUMENTS

2013/0121185 A1   5/2013  Li et al.
2018/0034515 A1*  2/2018  Guo .................. H04B 7/043
(Continued)

FOREIGN PATENT DOCUMENTS

CN        110447280 A    11/2019

OTHER PUBLICATIONS

International Search Report and Written Opinion for International Application No. PCT/IB2020/060678, mailed on Feb. 17, 2021, 3 pages.
(Continued)

*Primary Examiner* — Deepa Belur
(74) *Attorney, Agent, or Firm* — Lippes Mathias LLP

(57) ABSTRACT

According to an example embodiment, an example method may include estimating, by a receiver device in a wireless network, a set of one or more active beams for the receiver device based on an estimated receive power of each active beam to obtain an estimated set of one or more active beams for the receiver device; receiving, by the receiver device, verification information associated with the estimated set of one or more active beams for the receiver device; and, verifying, by the receiver device based on the verification information, the estimated set of one or more active beams for the receiver device.

22 Claims, 6 Drawing Sheets

(56) References Cited

U.S. PATENT DOCUMENTS

| | | |
|---|---|---|
| 2019/0007906 A1* | 1/2019 | Hessler ............... H04L 5/0048 |
| 2019/0045494 A1 | 2/2019 | Ho et al. |
| 2019/0254120 A1* | 8/2019 | Zhang ............... H04B 7/0695 |
| 2019/0273583 A1* | 9/2019 | Ugurlu ............... H04W 24/10 |
| 2019/0273637 A1 | 9/2019 | Zhang et al. |
| 2019/0297547 A1* | 9/2019 | Tsai ............... H04B 7/0695 |
| 2019/0327115 A1* | 10/2019 | Zhang ............... H04W 72/23 |
| 2019/0342872 A1 | 11/2019 | Rune et al. |
| 2021/0083914 A1* | 3/2021 | Cao ............... H04L 5/0053 |
| 2021/0273699 A1* | 9/2021 | Cao ............... H04B 7/0617 |
| 2022/0159544 A1* | 5/2022 | Gupta ............... H04W 72/52 |
| 2023/0300645 A1* | 9/2023 | Kwak ............... H04L 5/0091 370/242 |

OTHER PUBLICATIONS

3GPP TSG RAN WG1 Ad-Hoc Meeting 1901; R1-1900138; "Discussion on Multi-Beam Operation", Source: Vivo; Agenda Item: 7.2.8.3; Taipei, Taiwan; Jan. 21-25, 2019, 10 pages.

Office Action for India Application No. 202247030100, mailed on Sep. 21, 2022, 7 pages.

Fischer, "Observed Time Difference of Arrival (OTDOA) Positioning in 3GPP LTE", Qualcomm Technologies Inc, Jun. 6, 2014, pp. 1-62.

Apelfrøjd et al., "Low-Overhead Cyclic Reference Signals for Channel Estimation in FDD Massive MIMO", IEEE Transactions on Communications, vol. 67, No. 5, May 2019, pp. 3279-3291.

Zirwas et al., "Key Solutions for a Massive MIMO FDD System", IEEE 28th Annual International Symposium on Personal, Indoor, and Mobile Radio Communications (PIMRC), Oct. 8-13, 2017, 7 pages.

Office action received for corresponding European Patent Application No. 20811738.2, dated May 15, 2024, 5 pages.

Office action received for corresponding Chinese Patent Application No. 202080093139.9, dated Jul. 30, 2024, 11 pages of office action and no page of translation available.

"Further discussion on SLS and LLS evaluations", 3GPP TSG RAN WG1 Meeting #93, R1-1805910, Agenda: 7.4.4, Huawei, May 21-25, 2018, 15 pages.

"Beam Management—Beam Reporting", 3GPP TSG RAN WG1 NR Ad-Hoc Meeting, R1-1701091, Agenda: 5.1.2.2, Nokia, Jan. 16-20, 2017, 3 pages.

* cited by examiner

EFFICIENT BEAM MANAGEMENT FOR WIRELESS NETWORKS

CROSS-REFERENCE TO RELATED APPLICATIONS

This application is a national stage entry of International Application No. PCT/IB2020/060678, filed Nov. 13, 2020, entitled "EFFICIENT BEAM MANAGEMENT FOR WIRELESS NETWORKS" which claims the benefit of priority of U.S. Provisional Application No. 62/935,610, filed Nov. 14, 2019, both of which are hereby incorporated by reference in their entireties.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include estimating, by a receiver device in a wireless network, a set of one or more active beams for the receiver device based on an estimated receive power of each active beam to obtain an estimated set of one or more active beams for the receiver device; receiving, by the receiver device, verification information associated with the estimated set of one or more active beams for the receiver device; and verifying, by the receiver device based on the verification information, the estimated set of one or more active beams for the receiver device.

According to another example embodiment, a method may include transmitting, by a network node in a wireless network, a signal via each active beam of a multi-receiver device set of active beams, to allow one or more receiver devices to estimate a set of one or more active beams for the receiver device within the multi-receiver device set of active beams; and transmitting, by the network node to at least one receiver device of a group of receiver devices to be scheduled, verification information that allows the at least one receiver device to verify the estimated set of estimated active beams for the receiver device.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
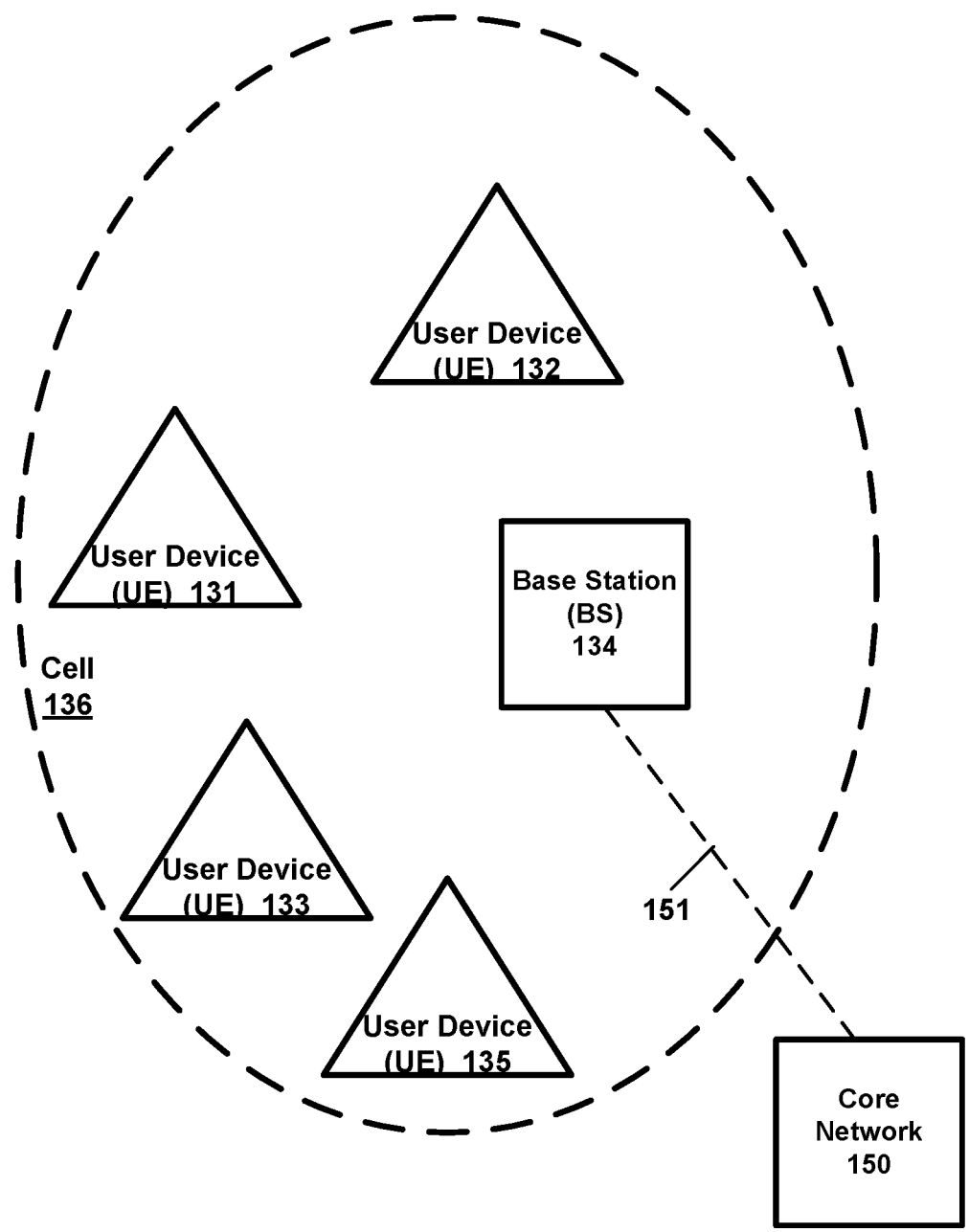
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e) Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a Si interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or Narrow Band IoT (NB-IoT) user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate (BLER) than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Network nodes (e.g., BSs or gNBs, UEs or user devices or receiver devices, relay stations or relay nodes, or other network nodes) may use beamforming, in which a set of antenna weights may be applied to generate a specific antenna beam width and shape for transmitting or receiving (e.g., in order to obtain a beamforming gain), instead of using an omnidirectional antenna. An antenna (or antenna array) may include multiple antenna elements, where a specific beam (e.g., including a beam direction and/or beam width) may be generated or obtained by applying a set of antenna weights (e.g., each antenna weight including an amplitude and phase) to the antenna array, with a different weight applied to each antenna element. For example, a direction of the beam from a phased antenna array may be changed by adjusting the phase of the signal applied to each of the elements in the antenna array. Thus, for example, a transmit beam may be generated for transmitting a signal, and a receive beam may be generated for receiving a signal.

As used herein, a receiver device may be (or may include) any device (e.g., wireless device) that may receive or be capable of receiving a wireless signal. A receiver device may also be capable of transmitting signals, and thus, e.g., may include one or more wireless transmitter/receivers (transceivers). For example, a receiver device may include a user device, a user equipment (UE), or other wireless device. Thus, in some examples described herein, the term UE (user equipment, may include a user device, a receiver device, or other wireless device). Likewise, the term BS may be used in a number of examples, and may include a gNB, an eNB, or any other network node.

In order to facilitate beamforming, a UE (or user device or receiver device) may be configured to send measurements reports to a BS (or other network node). For example, a BS may configure a UE to measure one or more quantities (e.g., reference signal receive power (RSRP), determine channel state information (CSI), or determine or measure other information or quantity) for one or more resources or beams. Thus, the measurement report configuration may indicate the quantity or quantities to be measured and for one or more specific resources or beams. For example, a UE may be configured to measure and report one or more quantities, e.g., CSI and/or RSRP for channel state information-reference signal (CSI-RS) beams and/or synchronization signal blocks (SSBs) beams. As an illustrative example, a UE may measure one or more signal parameters (e.g., link quality) of reference signals received from a BS, and may send a channel state information (CSI) report to the BS. An example CSI report, may include, for example, one or more of: a RSRP (reference signal receive power); a Rank Indicator (RI), which is a suitable number of transmission layers for a downlink (DL) transmission; a Precoder Matrix Indicator (PMI), which may indicate what a device (e.g., UE) estimates as a suitable precoder matrix based on the selected rank; and a Channel Quality Indication (or channel quality indicator) (CQI), which may express or indicate the BS-UE channel or link quality, as measured by the UE. The CQI may indicate what the UE estimates as a suitable channel coding rate and modulation scheme based on the selected precoder matrix.

However, in some cases, there may exist significant measurement and reporting overhead for a UE, e.g., based on a large number of beams/resources to be measured and/or reported. Furthermore, in some wireless networks, such as 5G/New Radio (NR), or at least in some cases, wireless channel conditions may change rapidly, which may cause the best or preferred beam (e.g., CSI-RS beam and/or SSB beam) to be used for transmission or reception to change rapidly as well. Thus, it may be useful for a UE to perform frequent beam measurement and reporting to a BS/gNB, in order to provide a good (or at least an acceptable) beam forming gain based on a selection of an appropriate beam for transmission and/or reception.

As an illustrative example, a cell free massive MIMO for frequency division duplex (FDD) system with fixed GoBs (grid of beams) may involve multi-site and multi-cell cooperation areas leading to a high number of beams per cooperation area. Such a cooperation area might then include, for example, 144 beams with two polarizations leading to exemplary 288 antenna ports (AP) or beams to be measured and/or reported, serving potentially up to 90 or 100 UEs (or more). However, with so many beams (e.g., 288) and e.g., tens of UEs (e.g., up to possibly 100 or more UEs) in a cooperation area, performing beam measurement and reporting for such a large number of beams and/or for a large number of UEs may present a huge processing and/or signalling overhead for both UEs and/or gNBs/BSs (or transmission/reception points) within the wireless network or cooperation area. Furthermore, limiting UE beam measurement and reporting to just one or few beams may limit beamforming gain performance, since an optimum or best beam may change frequently and may be outside of such a small group of beams to be measured and reported. In addition, in some cases, the BS or gNB(s) may send a signal with a set of bits indicating which beams should be measured and/or reported back to the gNB or BS. However, according to an example, in the case of such a large number of beams (e.g., 288), a BS or gNB may explicitly signal or send a bit string, e.g., 288 bits, to each UE to indicate which beams should be measured by the UE or which beams are active. However, a BS sending an explicit indication of beams to be measured by a UE may require a very large signalling overhead.

Therefore, one or more example embodiments are provided that may allow for a more efficient beam management, such as for or within wireless networks where there may be a relatively large number of beams and/or a significant number of UEs (or user devices or receiver devices), for example.

According to an example embodiment, a BS (or gNB or other network node) may select a set of active beams, where a signal, such as a beam-specific sequence (e.g., beam-specific sequence of reference signals), may (or will) be transmitted via each active beam of a full set of beams, and the signal (e.g., a beam-specific sequence (e.g., a beam-specific sequence of reference signals)) is not typically transmitted via the inactive (or deactivated) beams. Thus, in an example embodiment, a beam-specific sequence of reference signals may be transmitted only for each active beam of a full set (e.g., 288) of beams. For example, the network node may select, based on previously received beam measurement reports, a multi-user (or multi-UE, or multi-receiver device) set of beams, e.g., including at least one active beam for each (or one or more) UEs (or receiver devices) of a group of UEs to be scheduled (e.g., for each UE to be scheduled for a next scheduling period for transmission or reception of data). For example, each UE may report to a BS or network node a set of candidate (or relevant or best) beams for the UE, e.g., one or more candidate CSI-RS beams having a measured or estimated RSRP that is greater than a first power threshold. After receiving measurement reports (e.g., identifying a set of candidate beams) from each UE of a plurality of UEs, the BS may then select a multi-user (or multi-UE) set of active beams (e.g., which may be a subset of a full or complete set of beams, such as, for example, which may thereby reduce beam/reference signal interference and overhead). For example, the multi-UE set of active beams may include, e.g., at least one candidate beam for each UE of the group of UEs to be scheduled during a scheduling period (e.g., where a scheduling period may include a plurality of symbols, a transmission time interval (TTI), multiple TTIs, or other scheduling resources).

The BS (or network node) may transmit a signal, e.g., which may be a beam-specific sequence or other signal, via each active beam of a multi-UE (or multi-receiver device) set of active beams, to allow one or more UEs to estimate a set of one or more active beams for the UE within the multi-user (multi-UE, or multi-receiver device) set of active beams. For example, the UE may detect an active beam based on a detected beam (e.g., based on a detected signal or detected beam-specific sequence of reference signals transmitted via an associated active beam) having a receive power (e.g., RSRP) that is determined or estimated to be greater than a power threshold. Also, the UE may identify the beam or determine the beam identity of each active beam based one, e.g., either a set of beam-specific resources (e.g., time-frequency resources via which a signal for the beam is received and measured) for each active beam, or based on a beam-specific sequence of reference signals for (or associated with or transmitted via) the active beam. Thus, in an example embodiment, for example, a beam-specific sequence of reference signals may be associated with an active beam, and may be used by the UE to determine the beam identity of each active beam (e.g., where an active beam may have a receive power greater than a threshold). For example, the signal transmitted by BS via each active beam may be a signal, e.g., such as a beam-specific sequence, which may be, for example, a beam-specific sequence of reference signals (e.g., a beam-specific sequence of CSI-RS reference signals).

For example, the beam-specific sequence of reference signals may be or may include a beam-specific sequence of at least one of the following reference signals associated with an active beam: a channel state information-reference signal (CSI-RS), among a plurality of orthogonal channel state information-reference signals; a coded reference signal (e.g., coded CSI-RS) of a plurality of non-orthogonal coded reference signals, where each coded reference signal (e.g., each coded non-orthogonal CSI-RS signal) may have a code that is associated with or identifies a beam and may be shorter than a standard orthogonal CSI-RS signal; a synchronization signal block (SSB); a demodulation reference signal (DMRS); a tracking reference signal (TRS); or, a position reference signal (PRS).

Also, rather than the BS transmitting an explicit indication or list of active beams (e.g., indicating a list of active CSI-RS beams or active SSB beams) for measurement, which would create a large signalling overhead (e.g., 288 bits to indicate which of the 288 beams are active), one or more example embodiments may use or rely on the UE performing blind decoding in which the UE may blindly (e.g., without knowing in advance, or without receiving an explicit indication, of which beams will be active) estimate a set of one or more active beams for the UE, e.g., based on an estimated receive power of each active beam (e.g., where active beams may have a receive power or RSRP or other link quality above a threshold). Also, in an example embodiment, each UE may identify (or determine a beam identity of) each active beam based on the beam-specific sequence of reference signals transmitted via each active beam, or using other signal. UE may alternatively determine or identify an active beam based on the beam-specific time-frequency resources, e.g., where the UE may measure a beam receive power by measuring RSRP of a signal received via beam-specific time-frequency resources (resources assigned to or associated with each active beam).

In addition, because the UE estimating a set of active beams (e.g., determining or estimating a set of active beams based on received power of each beam, and/or determining the beam identity of the active beams based on the beam-specific sequence) may sometimes be prone to error(s), the BS or network node may also transmit, to at least one UE of a group of UEs to be scheduled, verification information that may allow the UE to verify the estimated set of active beams for the UE. As illustrative examples, the verification information transmitted or provided to a UE may include, e.g., redundancy bits that may allow the UE to verify (confirm the correctness of) and/or correct its estimated set of active beams. For example, the verification information may include a cyclic redundancy check (CRC), a hash value, or possibly other information that may be useful to a UE in verifying (at least in part) its estimated set of active beams.

Therefore, according to an example embodiment, a method may include transmitting, by a BS/gNB, a signal, e.g., such as a beam-specific sequence, via each active beam of a multi-user (or multi-UE) set of active beams, to allow one or more UEs to estimate a set of one or more active beams for the UE within the multi-UE set of active beams; and transmitting, by the BS to at least one UE of a group of UEs to be scheduled, verification information that allows the at least one UE to verify the estimated set of estimated active beams for the UE (or receiver device). For example, a beam-specific sequence of reference signals may be transmitted by the BS for each active beam, which may allow one or more UEs to estimate a set of one or more active beams for the UE within the multi-UE set of active beams based on an estimated receive power of each active beam, and which may also allow the UE to determine a beam identity of each active beam based on the beam-specific sequence of reference signals of each active beam.

Also, the BS may determine, for at least one UE, an active beam bit string that identifies the estimated set of one or more active beams for UE out of a plurality of beams. Also, for example, to avoid increasing signalling overhead, the BS typically does not transmit its active beam bit string to the UEs, but relies on each UE to determine or estimate its own active beam bit string based on the UE's blind or semi-blind estimation of a set of active beams for the UE of the set of candidate beams for the UE. Also, the BS transmitting verification information may include the BS transmitting redundancy bits associated with the active beam bit string to allow the UE (or receiver device) to verify and/or correct the UE estimated set of one or more active beams for the UE. For example, while the active beam bit string may not be transmitted by the BS to the UE, the BS may transmit a CRC or hash value computed over the active beam bit string (and/or other verification information). The UE may estimate its estimated set of active beams, and determine its own active beam bit string, and calculate a hash value or CRC over the UE determined active beam bit string. To perform verification and/or correction of the estimated set of active beams, the UE may then compare its calculated CRC or calculated hash value to the received CRC or hash value (the received verification information from the BS, e.g., included or appended to the downlink control information sent to the UE) to confirm that the UE's estimated set of active beams is correct (and/or to correct its estimated set of active beams). In this manner, the UE may use blind estimation (e.g., no list or explicit indication of active beams is provided by the BS to the UE in advance, or is not known by the UE) to estimate a set of active beams (e.g., measure power and detect a beam-specific sequence for each active beam, without receiving an explicit indication of the active beams), or using semi-blind decoding (e.g., wherein the UE may also take into account verification information to verify and/or correct its estimated set of active beams). Thus, the example techniques described herein may allow a UE to estimate and verify a UE estimated set of active beams (e.g., using blind estimation and/or semi-blind estimation), e.g., without incurring the significant signalling overhead associated with receiving an explicit indication or list of which beams will be active. For example, this may allow a UE to frequently (e.g., every scheduling period or every TTI) update its estimated set of active beams, without requiring the BS to send explicit information indicating the updated list of active beams for the scheduling period (since the UE may use blind or semi-blind estimation to estimate a set of active beams), and thereby reduce, or at least avoid increasing, signalling overhead.

Alternatively, rather than provide verification information as a separate CRC or hash value (e.g., separate from or in addition to downlink control information), the downlink control information transmitted by the BS may be encoded with the redundancy bits or verification information, e.g., using a systematic block code or other encoding technique. The UE may then receive and decode the received encoded downlink control information, to obtain the verification information or redundancy bits (e.g., CRC or hash value), which may then be used by the UE to verify and/or correct its estimated set of active beams.

Also, according to an example embodiment, the verification information may also (or alternatively) include, e.g., information indicating a number of active beams per cell or within a cooperation area; information indicating a percentage or proportion of active beams, of a full set of beams or the plurality of beams, within a cell or cooperation area; information indicating that a set of one or more active beams, for one or more receiver devices or within a cooperation area or a cell, has not changed during or since a last time period; information indicating that a set of one or more active beams, for one or more receiver devices or within a cooperation area or a cell, has completely changed during or since a last time period; or information indicating that a particular number or a particular percentage of active beams of a full set of beams or of the plurality of beams, has changed, or has not changed, during or since a last time period.

From the BS (or network node)-perspective, a method may include receiving, by the BS from each UE of a plurality of UEs within a wireless network, a measurement report identifying a set of candidate beams for the UE out of a full set of beams, wherein each candidate beam of the set of candidate beams for the UE has an estimated power above a first power threshold; determining, by the BS based on the received measurement report from each UE, the set of candidate beams for each UE; determining a group of UEs to be scheduled for transmission during a scheduling period; determining, by the BS based on the set of candidate beams for each UE of the group of UEs to be scheduled, a multi-UE set of active beams such that at least one active beam, among the candidate beams for a UE, will be provided for each of the UEs of the group of UEs to be scheduled; transmitting, by the network node, a beam-specific sequence of reference signals via each active beam of the multi-UE set of active beams, to allow one or more UEs to estimate a set of one or more active beams for the receiver device within the multi-receiver device set of active beams; and transmitting, by the BS to at least one UE of the group of UEs to be scheduled, verification information that allows the at least one UE to verify the estimated set of estimated active beams for the UE.

Likewise, from a UE-perspective, a method may include sending, by a UE, a measurement report identifying a set of candidate beams for the UE out of a full set of beams, wherein each candidate beam of the set of candidate beams has a measured power greater than a first power threshold; estimating, by the UE, a receive power of a beam-specific sequence received via each candidate beam of the set of candidate beams, wherein each beam-specific sequence is associated with or identifies a candidate beam; estimating, by the UE based on the estimated receive power of the beam-specific sequence for each candidate beam, a set of one or more active beams for the UE within the set of candidate beams for the UE, to obtain the estimated set of active beams for the UE, wherein each active beam of the estimated set of active beams has an associated beam-specific sequence having an estimated receive power (e.g., measured or estimated RSRP) greater than a second power threshold, and wherein each active beam of the estimated set of one or more active beams is identified based on the beam-specific sequence associated with the active beam. Further illustrative details and examples will now be provided.

Thus, one or more example embodiments may enable or allow a fast and/or efficient beam management in large cooperation areas that may include, for example, 144 beams with two polarizations each (e.g., providing 288 antenna ports or beams) by performing a blind or semi blind estimation of a set of activated beams. The presence of an active beam may be determined or estimated based on a beam-specific sequence, e.g., such as a beam-specific sequence of coded reference signals (e.g., coded CSI-RS signals) that is transmitted via an associated beam. Such a blind (e.g., estimating the active or activated beams without the BS transmitting information explicitly indicating the activated beams) estimation of active beams by a UE or semi blind activation (e.g., which may use verification information to verify and/or correct the estimated set of active beams) may avoids or at least decrease the related control signalling overhead and may reduce the related activation delay, which makes it possible to adapt (or change) the active beam sets more frequently and/or rapidly, such as every scheduling period, every TTI, or every few or multiple TTIs, per physical resource block (PRB) or per group or plurality of PRBs, where each PRB may include a plurality of (e.g., 12) subcarriers for one symbol. Furthermore, the estimated set of active beams may be verified (e.g., determined to be correct, or not) and/or corrected based on verification information, such as using a CRC, or a hash value, added to the physical downlink control channel (PDCCH) downlink control information (DCI) message transmitted by the BS. The BS/gNB may determine (e.g., based on measurement reports from UEs indicating candidate beams, and based on a group of UEs that are or will be scheduled for uplink data transmission and/or downlink data reception for the scheduling period) which beams will be active (or activated), and then may deactivate the remaining beams of the full set of beams.

Figure 2:
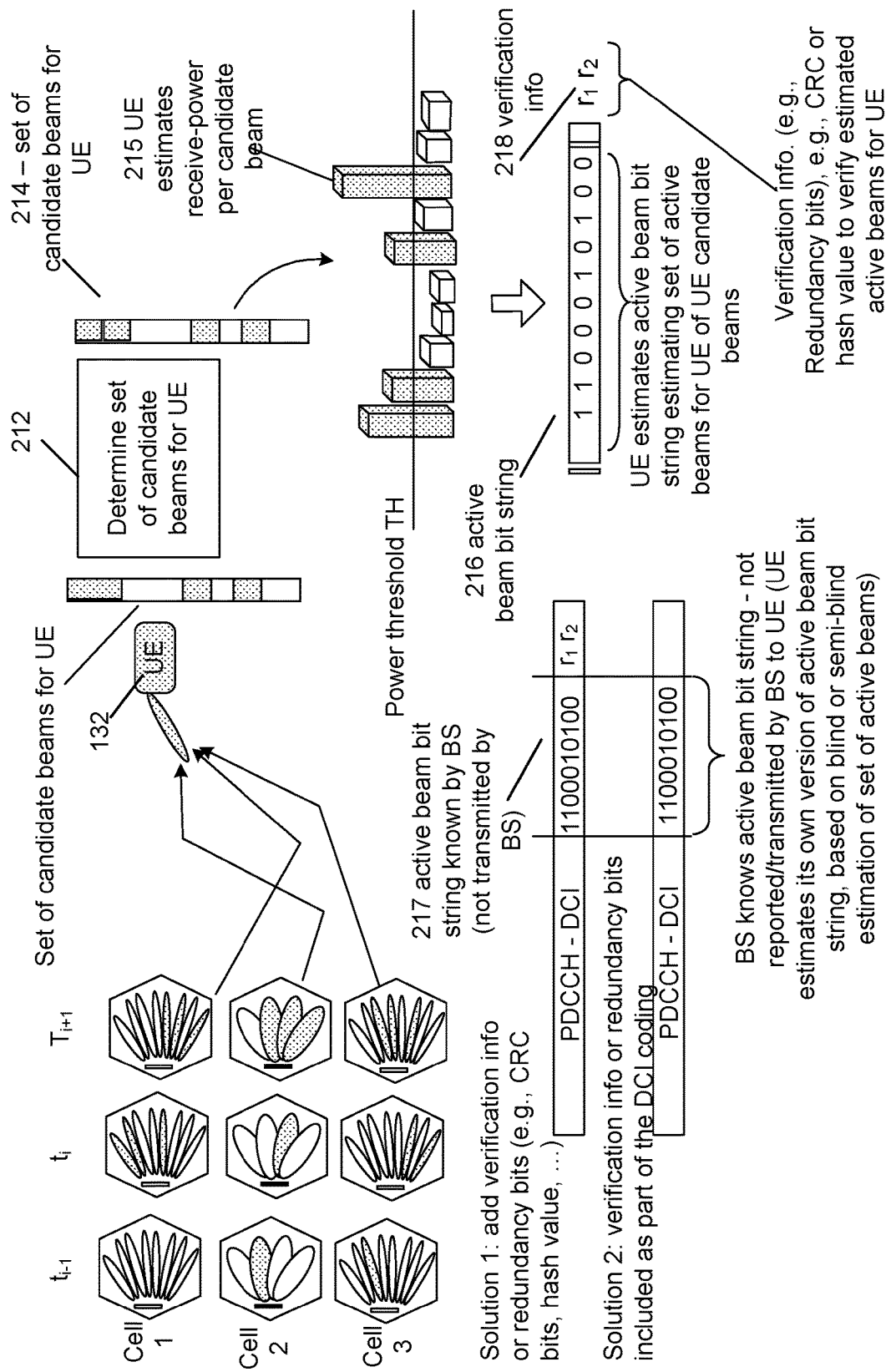
FIG. 2 is a diagram is a illustrating a process of estimating a set of active beams according to an illustrative example embodiment.

FIG. 2 is a diagram is a illustrating a process of estimating a set of active beams according to an illustrative example embodiment. Three example cells (cell 1, cell 2, cell 3) are shown, forming a fixed grid of beams, where some of the beams are active (e.g., the shaded beams), and some are inactive (or deactivated), as an illustrative example. In an example embodiment, semi statically (in the order of seconds e.g., every second or so) the BS/gNB transmits orthogonal CSI RSs for all beams (e.g., for all 288 beams) of the cooperation area so that all UEs can estimate their candidate set of beams, i.e., those beams which are received—or might be received—with a power above a certain threshold with respect to the strongest beam. At 212, UE 132 may measure RSRP of the 288 beams, and determine its candidate (or best) beams, e.g., those beams having a receive power greater than a first threshold. The set of candidate beams 214 are shown in FIG. 2 for UE 132. The UE then sends its CSI measurement report to the gNB, e.g., indicating RSRP of its candidate beams (or best beams), where candidate beams may, for example, include beams having a measured RSRP above a first threshold. The BS/gNB determines a multi-UE set of beams to be activated for a next time period, and which beams to be deactivated, among the 288 beams. For example, the BS/gNB may typically activate at least one candidate beam of each UE to be scheduled during a next scheduling period. However, various other factors may be used to determine which beams to activate, such as possible beam interference, and other factors.

One problem that may arise is the potential large signalling and measurement overhead of frequently transmitting beams, measuring beams, and sending measurement reports, e.g., every scheduling period for all 288 beams, for all UEs. An alternative may involve activating only a small subset of beams, and/or slowly changing or slowly adapting the beams, both of which may result in poor beamforming performance for UEs. Moreover, a BS explicitly signalling or indicating which of the 288 beams are active each period (e.g., via transmission of 288 bits of control information to indicate which beams are active and which beams are inactive) may also create a very large signalling overhead. One or more example embodiments described herein, where explicit signalling identifying active beams is not necessary (and/or is not transmitted), and each UE may blindly or semi-blindly estimate a set of active beams, and then use verification information provided by the BS/gNB to verify and/or correct its estimated set of active beams, may provide improved beamforming performance, while avoiding the large signalling overhead that would be required to explicitly signal to the UEs which of the (e.g., 288) beams are active each time period (e.g., each scheduling period).

Thus, according to an example embodiment, over different time instances ti (typically every TTI or every 5 ms) the gNB may activate a different subset of beams (e.g., the shaded beams) of all possible beams (e.g., the set of active beams per TTI or per scheduling period, may be based on which UEs are to be scheduled for that scheduling period or TTI, and the candidate beams reported by these UEs, e.g., so as to provide at least one (or more) candidate beams per scheduled UE). At 214, the UE has determined its set of candidate beams (for that time period or time interval), e.g., 10 or 20 candidate beams out of the 288 total beams, as an illustrative example.

In a second step (e.g., every scheduling period or every TTI), the BS/gNB may transmit the multi-UE set of active beams, with a beam-specific sequence (e.g., a beam-specific sequence of reference signals transmitted for each active beam. For example, an example beam-specific sequence may include a coded non-orthogonal CSI-RS signal, where a different beam-specific coded CSI-RS code/signal may be provided or transmitted via each active beam. Other types of beam-specific sequences may be used as well. At 215, the UE may then measure or estimate receive power (e.g., RSRP) of each beam of its set of candidate beams, where an active beam has a measured or estimated RSRP or receive power greater than a second threshold. Also, the UE may identify (or determine beam identity) of the active beams based on the beam-specific sequences transmitted for each active beam. Thus, at 215, each UE estimates in a first step the CSI (e.g., which may include estimating receive power or RSRP) for all of its candidate/relevant beams and then identifies the activated (or active) beams as those beams having a receive power (e.g., RSRP) above a certain power threshold. This power threshold may, for example, be chosen so that it will be above the noise and interference level of the CSI estimation process. The identification of the beam may be performed or based on the coded reference signals, e.g., beam-specific sequences, such as the non-orthogonal coded CSI-RS signals, which are transmitted by the BS/gNB for each active beam. For example, the coded CSI-RS signals are non-orthogonal, and thus, may be shorter (less signaling overhead) as compared to standard orthogonal and longer CSI-RS signals. The UE then measures the RSRP of each coded CSI-RS signal (or other beam-specific sequence) among its candidate beams. In some cases, the gNB is not transmitting some of the UE's candidate beams (the deactivated beams). In an example embodiment, the RSRP of the coded CSI signals that are deactivated, may typically (or may be expected to) be below the threshold, while the RSRP of the active beams would be expected to typically be above the threshold, in an illustrative example. However, in at least some cases, there may exist noise and other performance issues that may impair or limit the UE's estimation of its estimated set of active beams. Therefore, verification information may be provided or transmitted by the gNB/BS, and then may be used by the UE to verify and/or correct the UE estimated set of active beams.

Based on the UE's estimated set of active beams (215), the UE may determine or estimate an active beam bit string 216, e.g., where the bits of the active beam bit string 216 indicate which of the candidate beams for the UE are estimated to be active. As an illustrative example, as shown in FIG. 2, at 216, the active beam bit string 216 includes a 1 for each candidate beam that is estimated to be active, and a 0 for each candidate beam that is estimated to be inactive or deactivated. For example, the 1s, indicating an active beam in active beam bits string 216, may correspond to shaded beams with a RSRP or receive power that is greater than the power threshold (TH) at 215. It should be noted that the BS knows which UE candidate beams are active (upon which the BS transmitted a beam-specific sequence), and the BS knows which beams are inactive (where no beam-specific sequence has been transmitted on such inactive or deactivated beams). Thus, the BS may also generate its own copy of the active beam bit string at 217 (e.g., where the BS's copy of the active beam bit string at 217 will be correct, and not an estimate, since the BS knows which beams are active). Note that the active beam bit string may be generated by the BS/gNB (based on which beams are active), and may be estimated by each UE (e.g., using blind or semi-blind estimation by the UE based on receive power (e.g., RSRP) of the active beams being greater than a threshold, and beam identity of the active beams being determined by the UE based on the beam-specific sequences). However, in order to avoid increasing signaling overhead, the BS does not typically transmit the active beam bit string, but instead, may rely on each UE to generate its own estimated active beam bit string based on the UE performing blind estimation of its set of active beams, and identify the active beams based on the beam-specific sequences transmitted for each of the active beams. The BS/gNB may generate verification information, e.g., redundancy bits, such as a CRC or hash value computed over the active beam bit string 217, and then the BS/gNB may provide or transmit the verification information to the UE. At 218, the UE may receive the verification information, and may use the verification information (e.g., CRC, hash value, or other verification information) to verify and/or correct its estimated set of active beams (or to correct the UE's estimated active beam bit string 216). Also, as noted, the gNB/BS knows which beams are active beams for that time period or interval, e.g., for which beams (out of the full set of 288 beams or other number of beams) a beam-specific sequence was transmitted. Thus, the BS/gNB may correctly determine a multi-UE set of active beams, and thus determine the active beam bit string for each UE, e.g., indicating which beams are active out of each UE's list of candidate beams. As noted, according to an example embodiment, each UE previously reported its list of candidate beams to the BS/gNB based on RSRP beam measurements. Thus, the BS knows the list of candidate beams for each UE. The BS/gNB may then generate verification information, e.g., generate a CRC over (or based on) the UE-specific active beam bit stream (indicating the active beams out of the UE set of candidate beams), and then append the verification information or redundancy bits (e.g., CRC or Hash value) to the downlink control information (DCI) transmitted to the UE. Thus, the gNB may add or append verification information, e.g., as redundancy bits r1 to rx, as part of the PDCCH DCI messages. The redundancy bits may include or provide a CRC (or CRC check), a Hash value or other verification information.

The UE may then receive DCI, and the appended redundancy bits or other verification information. The UE may then use these redundancy bits r1 to rx to verify its beam activation inference and/or to even correct some miss-detections. UE can calculate a CRC over its estimated active beam bit string of estimated activated beams, and compare the calculated CRS to the received CRC (a match of the calculated CRC to the received CRC verifies that the UE's estimated active beam bit string is correct, or correctly indicates the active beams of the set of UE candidate beams). This is to allow the UE to determine which (subset) of its candidate beams will be activated (e.g., indicating those active beams where a beam-specific sequence, such as a coded CSI-RS signal, will be transmitted). In this manner, by deactivating some beams, and having only a subset of beams as active, this will decrease beam transmissions and decrease possible beam interference, and will decrease the number of beams that will be measured and reported by the UE (e.g., where UE may, in some cases, only measure and report the RSRP of the active beams of its candidate beams, based on the UE's blind or semi-blind estimation of active beams, and based on the UE using the verification information or redundancy bits to verify and/or correct the estimated set of active beams for the UE).

Thus, as shown in FIG. 2, two example solutions are shown for the BS/gNB to provide verification information to a UE: solution 1: the BS/gNB adds the verification information (e.g., CRC or hash value or other verification information) to the DCI (downlink control information) provided within the physical downlink control channel (PDCCH). In solution 2: the BS/gNB may encode the verification information or redundancy bits with the DCI (or provide the verification information or redundancy bits within the DCI coding), so that additional verification bits or redundancy bits (218) are not necessary (thereby reducing signaling overhead). Thus, for example, in solution 2, to avoid this extra overhead for the redundancy bits/verification information, for example in case there is a high number of active UEs, a more efficient solution may be provided that may include virtually adding the bit string of active beams to the PDCCH DCI message. Virtually means that the bit stream is not transmitted but will be estimated at the UE side and concatenated with the other part of the PDCCH DCI message. This virtually prolonged PDCCH DCI message will now be reencoded by the gNB (assuming that the bit stream is part of the PDCCH DCI message) and then transmitted to the UE. The benefit in this case is that i) there is no extra overhead at all and ii) the typical PDCCH DCI messages are much longer than the bit string of activated beams, which leads to a much better coding efficiency. It might allow, for example, to correct one to two miss-detected beams that way.

Note that the above solution 2 may use a systematic code (as an example code, or other code), which includes the bit string as such as one part of the code, where the gNB will encode the DCI bits and the verification information/redundancy bits using a systematic code or other code, and the UE would then decode the encoded DCI information, to extract the DCI bits and the verification information/redundancy bits.

As noted, in addition to (or in the alternative), other types of verification information may be provided or transmitted by a BS/gNB to a UE, e.g., to at least assist in verifying the UE estimate of active beams. Thus, for example, DCI messages may be provided to allow UEs to make better inferences about their candidate activated beams like a high-level indication of the average number of activated beams. Such a control message could, for example, broadcast that there is actually i) only one beam per cooperation area, ii) one beam per cell, iii) α×N beams active, where, for example, α={¾, ⅔, ¼, ⅛} and where N is number of overall beams of the cooperation area.

For the error correction after the first estimate at the UE side based on the estimated receive power per beam one may choose a soft decoding approach, i.e., one may include the RSRP power per beam, i.e., its strength against the noise and interference floor.

As another possible solution, in case the CRC check for the estimated beams fails at the UE side (e.g., where received CRC (redundancy bits) from BS does not match CRC calculated by UE), the UE may, for example, report the CSI or RSRP for all of its candidate beams, even though some of these beams might estimate only noise (since some of these UE candidate beams may be inactive or deactivated by the BS). The BS/gNB may then, based on its knowledge about the activated beams (the multi-UE set of active beams selected by the BS), skip the according useless CSI measurement reports for inactive or deactivated beams. To indicate such full candidate CSI (measurement) reports, the UE may set an according flag in the uplink control channel (UCI) message, e.g., a flag is indicated by UE of a 0 to indicate CSI/RSRP of only UE active beams within the set of UE candidate beams are reported, and a flag of 1: to indicate that RSRP or CSI of all candidate beams of UE are reported.

According to an example embodiment, a basis of the blind detection or blind or semi-blind estimation of a set of active beams of a set of UE candidate beams proposal may use or rely on a beam-specific sequence transmitted by the BS for each active beam, and where the UE may determine a beam identity of each active beam based on the beam-specific sequence of each active beam. For example, the beam-specific sequence may use non-orthogonal coded CSI-RSs (which may be referred to as coded CSI-RS signals), which may be shorter than orthogonal or standard CSI-RS signals, and thus reducing signalling overhead.

Other types of verification information may be provided by a BS/gNB, such as a DCI message which indicates that the gNB uses the same beam set versus a different set of activated beams. This might be extended to a short bitmap in case of varying beam sets over different frequency subbands. Furthermore, instead of one bit message it might include further information like 'fully unchanged', 'few beams changed', 'completely different beam set', or the number of beams that changed which helps the UEs to do the blind estimation process more efficiently. Generally, these DCI messages might be UE specific or a multicast message to specific UE groups or a cooperation area wide broadcast message. This might be for example helpful in case the beams for a certain UE subgroup remains unchanged, while another group is affected by the beam set adaptations.

Figure 3:
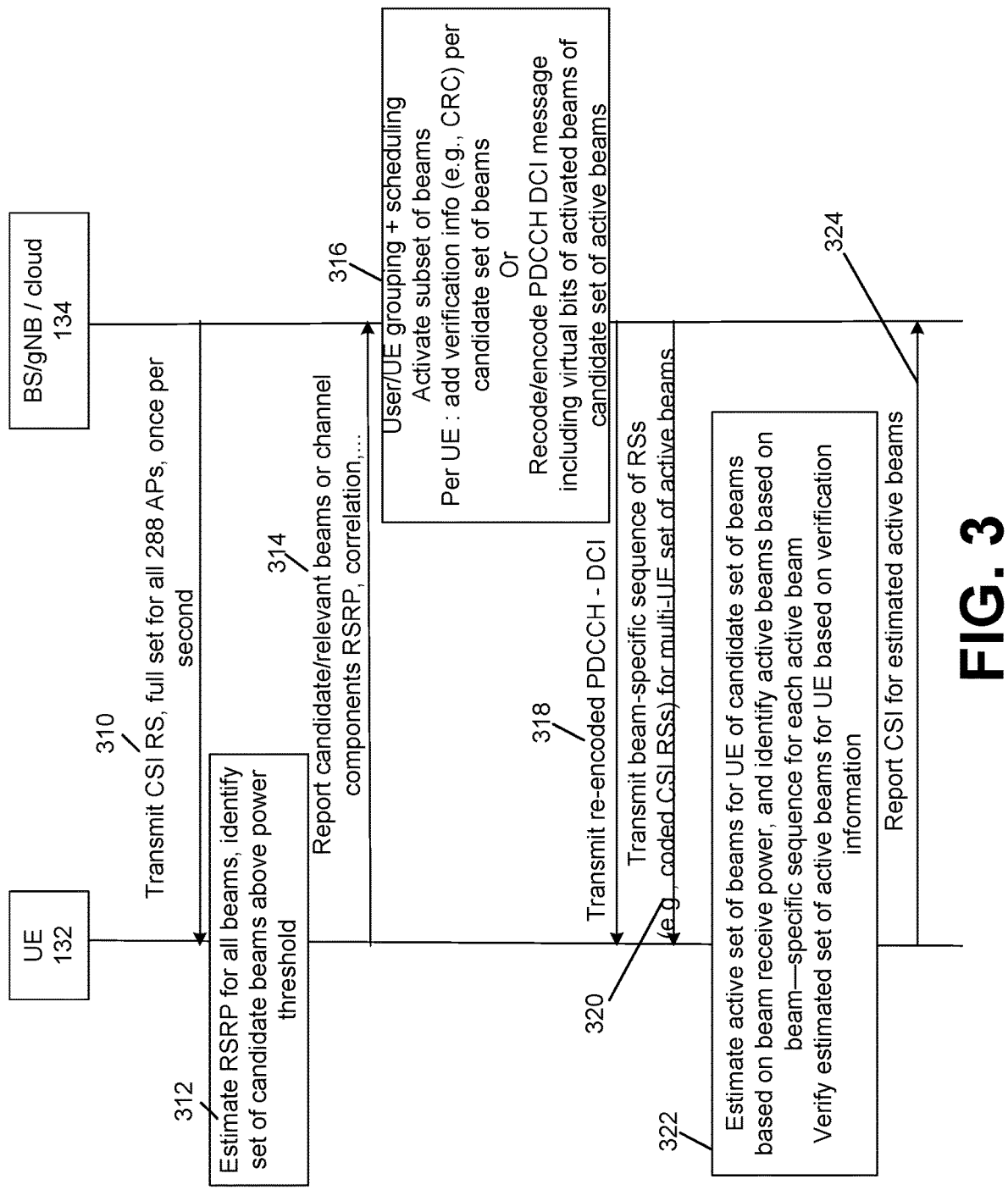
FIG. 3 is a flow chart illustrating operation according to an example embodiment.

FIG. 3 is a flow chart illustrating operation according to an example embodiment. At UE 132 may be in communication with a BS 134, gNB or node in the cloud, or other network node. At 310, the BS 134 transmit CSI-RS signals for a full set (or all) beams, e.g., for all 288 beams. At 312, the UE 132 may estimate a receive power or RSRP for each of the beams, and then determine or estimate a set of candidate beams, e.g., where each candidate beam has a measured or estimated RSRP above (or greater than) a first threshold. At 314, the UE may report a receive power or RSRP of each beam of its set of candidate beams.

At 316, the BS 134 may receive the measurement reports from UEs indicating their candidate beams, and may determine, e.g., based on UEs to be scheduled for a scheduling period and the candidate beams for these UEs to be scheduled, a multi-UE set of active beams, e.g., which may include at least one candidate beam for each UE to be scheduled (for a specific time or time instant). For each UE (e.g., each UE to be scheduled), the BS 134 may determine an active beam bit string and determine UE-specific verification information based on the UE-specific active beam bit string. For example, a CRC or a hash value may be calculated by the BS. For example, the verification information (e.g., CRC or hash value or other verification information) may be added or appended to the DCI information transmitted via the PDCCH, to each UE to be scheduled. Or the verification information may be encoded with the DCI, to avoid adding additional redundancy bits/verification information, while still providing the UE-specific verification information to each UE. Thus, because each UE has a different or UE-specific set of candidate beams, the active beam bit string may be UE-specific (may be different for each UE), and thus, the verification information or redundancy bits transmitted or provided (either separate or encoded with DCI) to each UE may be UE-specific.

At 318, the BS transmits the DCI via the PDCCH, and may, for example, include, e.g., either a coded DCI (that includes the verification information encoded with the DCI), or may include verification information provided as additional or separate bits appended to DCI. This DCI information and verification information may be transmitted for each UE of the plurality of UEs to be scheduled, for example. At 320, the BS 134 transmits the multi-UE set of active beams, where a beam-specific sequence (e.g., coded non-orthogonal CSI-RS signal, with a beam-specific code for each active beam) may be transmitted via each active beam, and no signals are transmitted via inactive (or deactivated) beams, for example.

At 322, the UE estimates a set of active beams within (or of) its set of candidate beams, e.g., where active beams may include beams with measured or estimated RSRP greater than a second threshold. Beam identity of active beams may be determined by the UE 132 based on the beam-specific sequence transmitted for each active beam. UE 132 may use the verification information to verify and/or correct its estimated set of active beams.

At 324, the UE 132 may measure RSRP or receive power of each of the active beams of its verified estimated set of active beams, and then send a CSI/RSRP measurement report for these active beams to the BS 132.

Some Example Benefit/Advantages:

At least in some cases, an extra control channel overhead for BS/gNB to explicitly indicate active beams may be avoided despite very fast and flexible beam activation and deactivation in a large cooperation areas.

Example embodiments may provide a flexible approach that may allow a large number of beams to be active, e.g., while, at least in some cases, avoiding signalling overhead to explicitly indicate which beams are active beams.

At least in some cases, an active beam set may be frequently changed or adapted, e.g., every scheduling period or TTI (or other period), based on changing channel conditions, while not increasing signalling overhead, based on blind or semi-blind estimating of active beams by the UE.

Compared to current NR solutions, one or more of the example embodiments may provide improved flexibility for beam activation and deactivation, e.g., in cases of high number of beams, with no or a limited control message overhead. As an illustrative example, the adaptation may be possible without involvement of any RRC messages, which are costly and time consuming as well as include large delays in the range of seconds or more so that a proper in time update to the served set of UEs is not possible.

At least in some cases, one or more example embodiments may avoid the need to broadcast or multicast an indication of activated beam sets as DCI or other control information in a CORESET (control resource set) to all the scheduled UEs.

At least in some cases, one or more example embodiments may allow for fast adaptation of active beam sets with low PDCCH (downlink control channe) overhead so that the BS or network maintains full scheduling and user grouping flexibility. Note, for example, that the benefit of fine granular beam deactivation to the served set of UEs includes a low CSI reporting overhead, a higher CSI estimation quality due to lower CSI RS crosstalk plus a higher JT CoMP (joint transmission cooperative multipoint) precoding performance as a result of the better CSI accuracy as well as lower precoding complexity due to lower number of beams, for example. This also may allow for a more efficient beam activation and/or deactivation. Some illustrative examples are now described.

Figure 4:
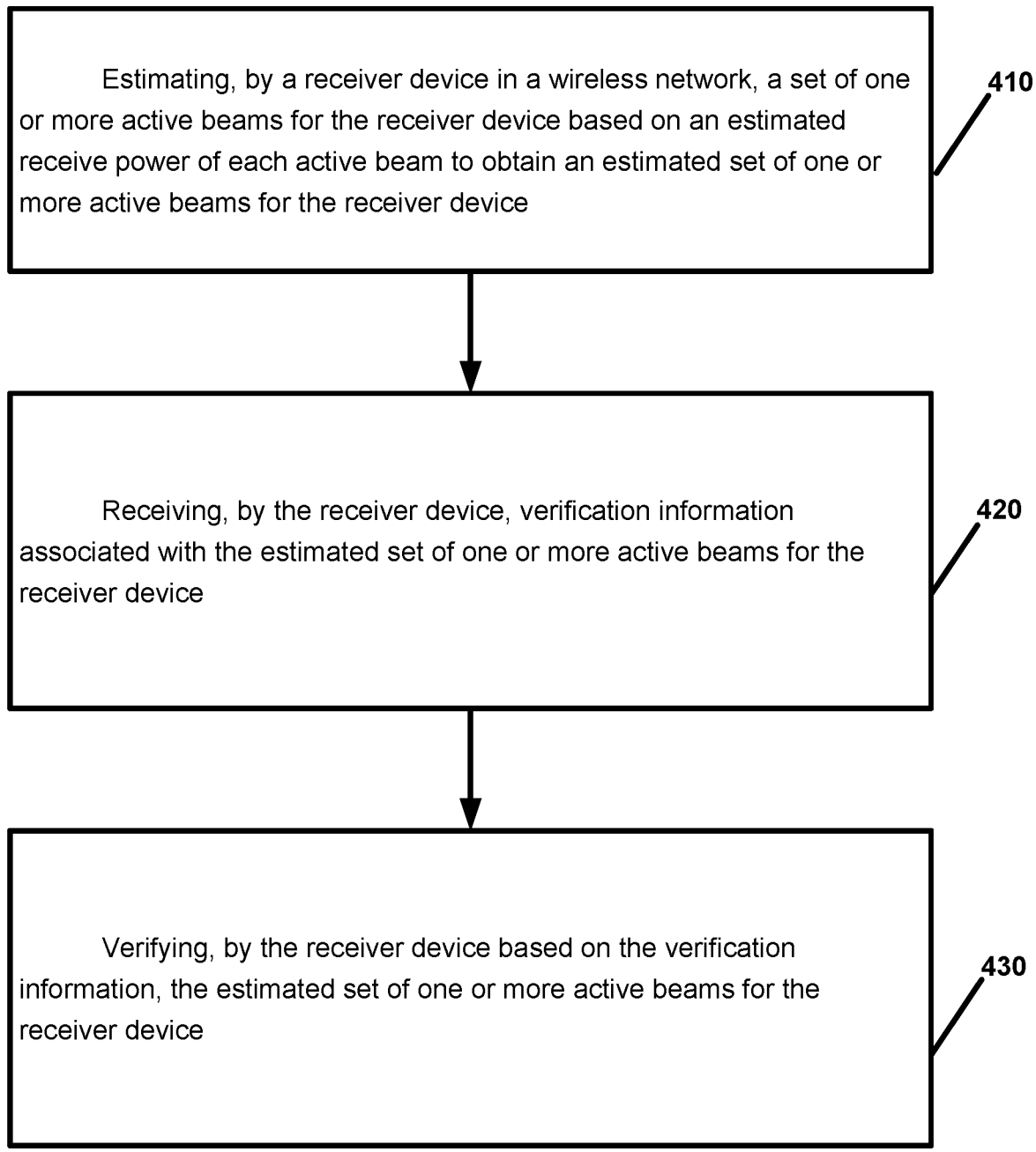
FIG. 4 is a flow chart illustrating operation of a receiver according to an example embodiment.

Example 1. FIG. 4 is a flow chart illustrating operation of a receiver device (e.g., user device, UE, or other node or device) according to an example embodiment. Operation 410 includes estimating, by a receiver device in a wireless network, a set of one or more active beams for the receiver device based on an estimated receive power of each active beam to obtain an estimated set of one or more active beams for the receiver device. Operation 420 includes receiving, by the receiver device, verification information associated with the estimated set of one or more active beams for the receiver device. And, operation 430 includes verifying, by the receiver device based on the verification information, the estimated set of one or more active beams for the receiver device.

Example 2. The method of Example 1, further comprising: determining, by the receiver device, a beam identity of each active beam based on at least one of: a set of one or more time-frequency resources associated with each active beam, wherein an estimated receive power of a first active beam of the set of one or more active beams includes an estimated receive power of a signal received via a first set of one or more time-frequency resources associated with the first active beam; or a beam-specific sequence for each active beam of the set of one or more active beams.

Example 3. The method of Example 1, wherein the estimating comprises: estimating, by a receiver device in a wireless network, a set of one or more active beams for the receiver device based on an estimated receive power of each active beam and a beam-specific sequence for each active beam of the set of one or more active beams to obtain an estimated set of one or more active beams for the receiver device.

Example 4. The method of Example 1 wherein the estimating a set of active beams comprises: estimating, by the receiver device, a receive power for each of a plurality of beams; and, determining, by the receiver device, one or more active beams, of the plurality of beams, wherein each active beam has an estimated receive power that is greater than a threshold and has a beam identity determined by the receiver device based on a beam-specific sequence of reference signals received for each active beam.

Example 5. The method of any of Examples 3-4 wherein the estimating a set of one or more active beams comprises: estimating, by the receiver device, a receive power for each of a plurality of beams; detecting, by the user device, one or more active beams, of the plurality of beams, wherein each active beam has an estimated receive power that is greater than a threshold; and, identifying, by the user device, a beam identity of each active beam of the set of one or more active beams based on a beam-specific sequence of reference signals received for each active beam.

Example 6. The method of any of Examples 3-5, wherein the estimating a set of one or more active beams comprises: determining, by the receiver device based on the estimated receive power for each of the plurality of beams, an active beam bit string that identifies the estimated set of one or more active beams out of the plurality of beams; wherein the verifying comprises, verifying, based on the verification information and the active beam bit string, that the active beam bit string identifies a correct set of active beams out of the plurality of beams.

Example 7. The method of Example 6, wherein the receiving, by the receiver device, verification information comprises: receiving redundancy bits associated with the active beam bit string; wherein the verifying comprises verifying, by the receiver device, the estimated set of one or more active beams for the receiver device based on the redundancy bits and the active beam bit string.

Example 8. The method of any of Examples 6-7, wherein the receiving, by the receiver device, verification information comprises: receiving a cyclic redundancy check associated with the active beam bit string; wherein the verifying comprises: calculating a calculated cyclic redundancy check over the active beam bit string; and comparing the calculated cyclic redundancy check to the received cyclic redundancy check to verify that the calculated cyclic redundancy check is the same as the received cyclic redundancy check.

Example 9. The method of any of Examples 6-8, wherein the receiving, by the receiver device, verification information comprises receiving a hash value associated with the active beam bit string; wherein the verifying comprises: calculating a hash value based on the active beam bit string; and comparing the calculated hash value to the received hash value to verify that the calculated hash value is the same as the received hash value.

Example 10. The method of any of Examples 7-9, further comprising: correcting, by the receiver device, the estimated set of one or more active beams based on the redundancy bits and the active beam bit string.

Example 11. The method of any of Examples 6-10, wherein the receiving verification information comprises: receiving, by the receiver device, encoded information in which downlink control information has been encoded with redundancy bits associated with the active beam bit string; and wherein the verifying comprises: decoding the encoded information to obtain the verification information; and, verifying, by the user device, the estimated set of active beams for the receiver device based on the obtained verification information and the active beam bit string.

Example 12. The method of any of Examples 1-11, wherein the verification information comprises at least one of the following: information indicating a number of active beams per cell or within a cooperation area; information indicating a percentage or proportion of active beams, of a full set of beams or the plurality of beams, within a cell or cooperation area; information indicating that a set of one or more active beams, for one or more receiver devices or within a cooperation area or a cell, has not changed during or since a last time period; information indicating that a set of one or more active beams, for one or more receiver devices or within a cooperation area or a cell, has completely changed during or since a last time period; or information indicating that a particular number or a particular percentage of active beams of a full set of beams or of the plurality of beams, has changed, or has not changed, during or since a last time period.

Example 13. The method of any of Examples 3-12, further comprising: sending, by the receiver device to a base station or network node, a measurement report to report at least one of a channel state information or the estimated receive power for each of the active beams of the verified estimated set of one or more active beams for the receiver device.

Example 14. The method of any of Examples 1-13, wherein the beam-specific sequence for each active beam comprises a beam-specific sequence of at least one of the following associated with an active beam: a channel state information-reference signal (CSI-RS), among a plurality of orthogonal channel state information-reference signals; a coded reference signal of a plurality of non-orthogonal coded reference signals; a synchronization signal block (SSB); a demodulation reference signal (DMRS); a tracking reference signal (TRS); or a position reference signal (PRS).

Example 15. The method of any of Examples 1-14, further comprising: sending, by the receiver device, a measurement report identifying a set of candidate beams for the receiver device out of a full set of beams, wherein each candidate beam of the set of candidate beams has a measured power greater than a first power threshold; and estimating, by the receiver device, a receive power of a beam-specific sequence received via each candidate beam of the set of candidate beams, wherein each beam-specific sequence is associated with or identifies a candidate beam; and wherein the estimating a set of one or more active beams for the receiver device comprises estimating, by the receiver device based on the estimated receive power of the beam-specific sequence for each candidate beam, a set of one or more active beams for the receiver device within the set of candidate beams for the receiver device, to obtain the estimated set of active beams for the receiver device, wherein each active beam of the estimated set of active beams has an associated beam-specific sequence having an estimated receive power greater than a second power threshold, and wherein each active beam of the estimated set of one or more active beams is identified based on the beam-specific sequence associated with the active beam.

Example 16. The method of any of Examples 1-15, wherein the receiver device comprises a user device or a user equipment (UE).

Example 17. An apparatus comprising means for performing the method of any of Examples 1-15.

Example 18. A non-transitory computer-readable storage medium comprising instructions stored thereon that, when executed by at least one processor, are configured to cause a computing system to perform the method of any of Examples 1-15.

Example 19. An apparatus comprising: at least one processor; and at least one memory including computer program code; the at least one memory and the computer program code configured to, with the at least one processor, cause the apparatus at least to perform the method of any of Examples 1-15.

Figure 5:
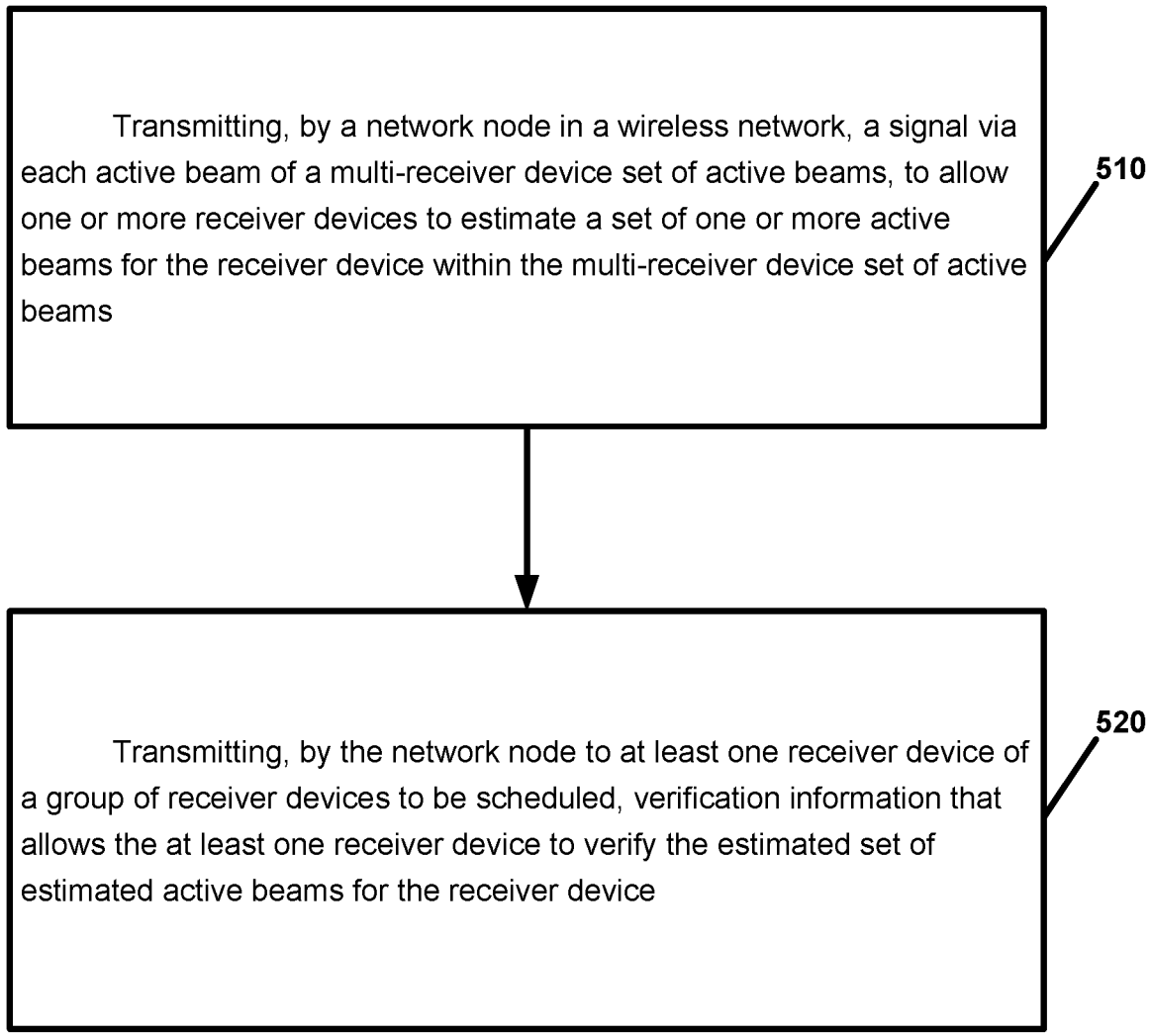
FIG. 5 is a flow chart illustrating operation of a network node according to an example embodiment.

Example 20. FIG. 5 is a flow chart illustrating operation of a network node according to an example embodiment. Operation 510 includes transmitting, by a network node in a wireless network, a signal (e.g., such as a beam-specific sequence or other signal) via each active beam of a multi-receiver device set of active beams, to allow one or more receiver devices to estimate a set of one or more active beams for the receiver device within the multi-receiver device set of active beams. Operation 520 includes transmitting, by the network node to at least one receiver device of a group of receiver devices to be scheduled, verification information that allows the at least one receiver device to verify the estimated set of estimated active beams for the receiver device.

Example 21. The method of Example 20, wherein the transmitting a signal comprises: transmitting, by a network node in a wireless network, a beam-specific sequence via each active beam of a multi-receiver device set of active beams, to allow one or more receiver devices to estimate a set of one or more active beams for the receiver device within the multi-receiver device set of active beams.

Example 22. The method of Example 21, wherein the transmitting a beam-specific sequence comprises: transmitting, by a network node in a wireless network, a beam-specific sequence of reference signals via each active beam of a multi-receiver device set of active beams, to allow one or more receiver devices to estimate a set of one or more active beams for the receiver device within the multi-receiver device set of active beams based on an estimated receive power of each active beam and determine a beam identity of each active beam based on the beam-specific sequence of reference signals of each active beam.

Example 23. The method of any of Examples 20-22, further comprising: determining, for the at least one receiver device, an active beam bit string that identifies the estimated set of one or more active beams for the user device out of a plurality of beams.

Example 24. The method of Example 23 wherein the transmitting, by the network node, verification information comprises: transmitting redundancy bits associated with the active beam bit string to allow the at least one receiver device verify and/or correct the estimated set of one or more active beams for the at least one receiver device.

Example 25. The method of any of Examples 23-24 wherein the transmitting, by the network node, verification information comprises: transmitting a cyclic redundancy check associated with the active beam bit string, to allow the at least one receiver device to verify and/or correct the estimated set of one or more active beams for the at least one receiver device.

Example 26. The method of any of Examples 23-25 wherein the transmitting, by the network node, verification information comprises transmitting a hash value associated with or based on the active beam bit string.

Example 27. The method of any of Examples 23-26, wherein the transmitting verification information comprises: transmitting, by the network node, encoded information in which downlink control information has been encoded with redundancy bits associated with the active beam bit string.

Example 28. The method of any of Examples 20-27, wherein the verification information comprises at least one of the following: information indicating a number of active beams per cell or within a cooperation area; information indicating a percentage or proportion of active beams, of a full set of beams or the plurality of beams, within a cell or cooperation area; information indicating that a set of one or more active beams, for one or more receiver devices or within a cooperation area or a cell, has not changed during or since a last time period; information indicating that a set of one or more active beams, for one or more receiver devices or within a cooperation area or a cell, has completely changed during or since a last time period; or information indicating that a particular number or a particular percentage of active beams of a full set of beams or of the plurality of beams, has changed, or has not changed, during or since a last time period.

Example 29. The method of any of Examples 20-28, further comprising: receiving, by network node from the at least one receiver device, a measurement report to report channel state information and/or an estimated receive power for each of the active beams of the verified estimated set of one or more active beams for the user device.

Example 30. The method of any of Examples 20-29, wherein the beam-specific sequence for each active beam comprises a beam-specific sequence of at least one of the following signals associated with an active beam: a channel state information-reference signal (CSI-RS), of a plurality of orthogonal channel state information-reference signals; a coded reference signal of a plurality of non-orthogonal coded reference signals; a synchronization signal block (SSB); a demodulation reference signal (DMRS); a tracking reference signal (TRS); or a position reference signal (PRS).

Example 31. The method of any of Examples 21-30, further comprising: receiving, by the network node from each receiver device of a plurality of receiver devices within a wireless network, a measurement report identifying a set of candidate beams for the receiver device out of a full set of beams, wherein each candidate beam of the set of candidate beams for the receiver device has an estimated power above a first power threshold; determining, by the network node based on the received measurement report from each receiver device of the plurality of receiver devices, the set of candidate beams for each receiver device of the plurality of receiver devices; determining a group of receiver devices to be scheduled for transmission during a scheduling period; determining, by the network node based on the set of candidate beams for each receiver device of the group of receiver devices to be scheduled, a multi-receiver device set of active beams such that at least one active beam, among the candidate beams for a receiver device, will be provided for each of the receiver devices of the group of receiver devices to be scheduled; wherein the transmitting a beam specific sequence comprises transmitting, by the network node, a beam-specific sequence of reference signals via each active beam of the multi-receiver device set of active beams, to allow one or more receiver devices to estimate a set of one or more active beams for the receiver device within the multi-receiver device set of active beams.

Example 32. An apparatus comprising means for performing the method of any of Examples 20-31.

Example 33. A non-transitory computer-readable storage medium comprising instructions stored thereon that, when executed by at least one processor, are configured to cause a computing system to perform the method of any of Examples 20-31.

Example 34. An apparatus comprising: at least one processor; and at least one memory including computer program code; the at least one memory and the computer program code configured to, with the at least one processor, cause the apparatus at least to perform the method of any of Examples 20-31.

Figure 6:
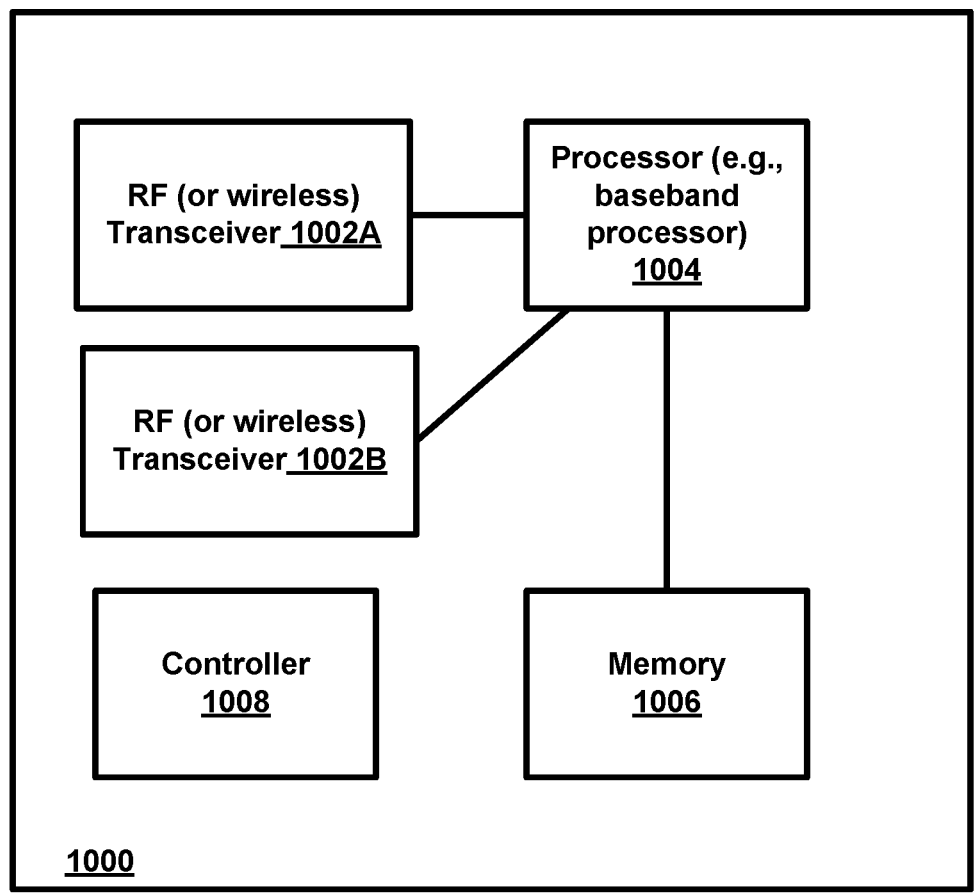
FIG. 6 is a block diagram of a wireless station or network node (e.g., AP, BS, RAN node, gNB, UE or user device, receiver device, or other network node) according to an example embodiment.

FIG. 6 is a block diagram of a wireless station or network node (e.g., AP, BS, gNB or user device/UE, or other network node) 1000 according to an example embodiment. The wireless station 1000 may include, for example, one or more (e.g., two as shown in FIG. 6) RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 6, a controller (or processor) 1008 may execute software and instructions, and may provide overall control for the station 1000, and may provide control for other systems not shown in FIG. 6, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising: at least one processor; and
at least one non-transitory memory including computer program code; the at least one non-transitory memory and the computer program code configured to, with the at least one processor, cause the apparatus at least to:
estimate, by a receiver device in a wireless network, a set of one or more active beams for the receiver device based on an estimated receive power of each active beam to obtain an estimated set of one or more active beams for the receiver device;
receive, by the receiver device, verification information associated with the estimated set of one or more active beams for the receiver device; and
verify, by the receiver device based on the verification information, the estimated set of one or more active beams for the receiver device,
wherein the processor, the at least one non-transitory memory and the computer program code being configured to estimate comprises being configured to cause the apparatus to:
estimate, by a receiver device in a wireless network, a set of one or more active beams for the receiver device based on an estimated receive power of each active beam and a beam-specific sequence for each active beam of the set of one or more active beams to obtain an estimated set of one or more active beams for the receiver device, wherein the processor, the at least one non-transitory memory and the computer program code being configured to estimate a set of one or more active beams comprises being configured to cause the apparatus to;
determine, by the receiver device based on the estimated receive power for each of the plurality of beams, an active beam bit string that identifies the estimated set of one or more active beams out of the plurality of beams;
wherein the being configured to cause the apparatus to verify comprises being configured to cause the apparatus to verify, based on the verification information and the active beam bit string, that the active beam bit string identifies a correct set of active beams out of the plurality of beams,
wherein the processor, the at least one non-transitory memory and the computer program code being configured to receive, by the receiver device, verification information comprises being configured to cause the apparatus to:
receive redundancy bits associated with the active beam bit string;
wherein the being configured to cause the apparatus to verify comprises being configured to cause the apparatus to verify, by the receiver device, the estimated set of one or more active beams for the receiver device based on the redundancy bits and the active beam bit string.

2. The apparatus of claim 1, wherein the processor, the at least one non-transitory memory and the computer program code being further configured to cause the apparatus to:
determine, by the receiver device, a beam identity of each active beam based on at least one of:
a set of one or more time-frequency resources associated with each active beam, wherein an estimated receive power of a first active beam of the set of one or more active beams includes an estimated receive power of a signal received via a first set of one or more time-frequency resources associated with the first active beam; or
a beam-specific sequence for each active beam of the set of one or more active beams.

3. The apparatus of claim 1, wherein the processor, the at least one non-transitory memory and the computer program code being configured to estimate a set of active beams comprises being configured to cause the apparatus to:
estimate, by the receiver device, a receive power for each of a plurality of beams;
determine, by the receiver device, one or more active beams, of the plurality of beams, wherein each active beam has an estimated receive power that is greater than a threshold and has a beam identity determined by the receiver device based on a beam-specific sequence of reference signals received for each active beam.

4. The apparatus of claim 1, wherein the processor, the at least one non-transitory memory and the computer program code being configured to estimate a set of one or more active beams comprises being configured to cause the apparatus to:
estimate, by the receiver device, a receive power for each of a plurality of beams;
detect, by the user device, one or more active beams, of the plurality of beams, wherein each active beam has an estimated receive power that is greater than a threshold; and
identify, by the user device, a beam identity of each active beam of the set of one or more active beams based on a beam-specific sequence of reference signals received for each active beam.

5. The apparatus of claim 1, wherein the processor, the at least one non-transitory memory and the computer program code being configured to cause the apparatus to receive, by the receiver device, verification information comprises being configured to cause the apparatus to:
receive a cyclic redundancy check associated with the active beam bit string;
wherein-the-being-configured-to-cause-the-apparatus to verify comprises being configured-to-cause-the-apparatus-to:
calculating a calculated cyclic redundancy check over the active beam bit string; and
comparing the calculated cyclic redundancy check to the received cyclic redundancy check to verify that the calculated cyclic redundancy check is the same as the received cyclic redundancy check.

6. The apparatus of claim 1, wherein the processor, the at least one non-transitory memory and the computer program code being configured to cause the apparatus to receive, by the receiver device, verification information comprises being-configured-to-cause-the-apparatus-to receive a hash value associated with the active beam bit string;
wherein the being configured to cause the apparatus to verify comprises being configured-to-cause-the-apparatus-to:
calculate-calculating a hash value based on the active beam bit string; and
compare-comparing the calculated hash value to the received hash value to verify that the calculated hash value is the same as the received hash value.

7. The apparatus of claim 1, comprising the processor, the at least one non-transitory memory and the computer program code being configured to further cause the apparatus to:
correct, by the receiver device, the estimated set of one or more active beams based on the redundancy bits and the active beam bit string.

8. The apparatus of claim 1, wherein the processor, the at least one non-transitory memory and the computer program code being configured to cause the apparatus to receive verification information comprises being configured to cause the apparatus to:
receive, by the receiver device, encoded information in which downlink control information has been encoded with redundancy bits associated with the active beam bit string; and
wherein the being configured to cause the apparatus to verify comprises being configured to cause the apparatus to:
decode the encoded information to obtain the verification information;
verify, by the user device, the estimated set of active beams for the receiver device based on the obtained verification information and the active beam bit string.

9. The apparatus of claim 1, wherein the verification information comprises at least one of the following:
information indicating a number of active beams per cell or within a cooperation area;
information indicating a percentage or proportion of active beams, of a full set of beams or the plurality of beams, within a cell or cooperation area;
information indicating that a set of one or more active beams, for one or more receiver devices or within a cooperation area or a cell, has not changed during or since a last time period;
information indicating that a set of one or more active beams, for one or more receiver devices or within a cooperation area or a cell, has completely changed during or since a last time period; or
information indicating that a particular number or a particular percentage of active beams of a full set of beams or of the plurality of beams, has changed, or has not changed, during or since a last time period.

10. The apparatus of claim 1, wherein the processor, the at least one non-transitory memory and the computer program code being configured to further cause the apparatus to:
send, by the receiver device to a base station or network node, a measurement report to report at least one of a channel state information or the estimated receive power for each of the active beams of the verified estimated set of one or more active beams for the receiver device.

11. The apparatus of claim 1, wherein the beam-specific sequence for each active beam comprises a beam-specific sequence of at least one of the following associated with an active beam:
   a channel state information-reference signal (CSI-RS), among a plurality of orthogonal channel state information-reference signals; or
   a coded reference signal of a plurality of non-orthogonal coded reference signals; a synchronization signal block (SSB);
   a demodulation reference signal (DMRS);
   a tracking reference signal (TRS); or
   a position reference signal (PRS).

12. The apparatus of claim 1, wherein the processor, the at least one non-transitory memory and the computer program code being configured to further cause the apparatus to:
   send, by the receiver device, a measurement report identifying a set of candidate beams for the receiver device out of a full set of beams, wherein each candidate beam of the set of candidate beams has a measured power greater than a first power threshold; and
   estimate, by the receiver device, a receive power of a beam-specific sequence received via each candidate beam of the set of candidate beams, wherein each beam-specific sequence is associated with or identifies a candidate beam; and
   wherein the being configured to cause the apparatus to estimate a set of one or more active beams for the receiver device comprises being configured to cause the apparatus to estimate, by the receiver device based on the estimated receive power of the beam-specific sequence for each candidate beam, a set of one or more active beams for the receiver device within the set of candidate beams for the receiver device, to obtain the estimated set of active beams for the receiver device, wherein each active beam of the estimated set of active beams has an associated beam-specific sequence having an estimated receive power greater than a second power threshold, and wherein each active beam of the estimated set of one or more active beams is identified based on the beam-specific sequence associated with the active beam.

13. The apparatus of claim 1, wherein the receiver device comprises a user device or a user equipment (UE).

14. An apparatus comprising:
   at least one processor; and
   at least one non-transitory memory including computer program code; the at least one non-transitory memory and the computer program code configured to, with the at least one processor, cause the apparatus at least to:
   transmit, by a network node in a wireless network, a signal via each active beam of a multi-receiver device set of active beams, to allow one or more receiver devices to estimate a set of one or more active beams for the receiver device within the multi-receiver device set of active beams; and
   transmit, by the network node to at least one receiver device of a group of receiver devices to be scheduled, verification information that allows the at least one receiver device to verify the estimated set of estimated active beams for the receiver device,
   wherein the processor, the at least one non-transitory memory and the computer program code being configured to further cause the apparatus to:
   determine, for the at least one receiver device, an active beam bit string that identifies the estimated set of one or more active beams for the user device out of a plurality of beams,
   wherein the processor, the at least one non-transitory memory and the computer program code being configured to cause the apparatus to transmit, by the network node, verification information comprises being configured to cause the apparatus to:
   transmit redundancy bits associated with the active beam bit string to allow the at least one receiver device verify and/or correct the estimated set of one or more active beams for the at least one receiver device.

15. The apparatus of claim 14, wherein the processor, the at least one non-transitory memory and the computer program code being configured to cause the apparatus to transmit a signal comprises being configured to cause the apparatus to:
   transmit, by a network node in a wireless network, a beam-specific sequence via each active beam of a multi-receiver device set of active beams, to allow one or more receiver devices to estimate a set of one or more active beams for the receiver device within the multi-receiver device set of active beams.

16. The apparatus of claim 15, wherein the processor, the at least one non-transitory memory and the computer program code being configured to cause the apparatus transmit a beam-specific sequence comprises being configured to cause the apparatus to:
   transmit, by a network node in a wireless network, a beam-specific sequence of reference signals via each active beam of a multi-receiver device set of active beams, to allow one or more receiver devices to estimate a set of one or more active beams for the receiver device within the multi-receiver device set of active beams based on an estimated receive power of each active beam and determine a beam identity of each active beam based on the beam-specific sequence of reference signals of each active beam.

17. The apparatus of claim 14 wherein the processor, the at least one non-transitory memory and the computer program code being configured to transmit, by the network node, verification information comprises being configured to cause the apparatus to:
   transmit a cyclic redundancy check associated with the active beam bit string, to allow the at least one receiver device to verify and/or correct the estimated set of one or more active beams for the at least one receiver device.

18. The apparatus of claim 14 wherein the processor, the at least one non-transitory memory and the computer program code being configured to cause the apparatus to transmit, by the network node, verification information comprises being configured to cause the apparatus to:
   transmit a hash value associated with or based on the active beam bit string.

19. The apparatus of claim 14, wherein the processor, the at least one non-transitory memory and the computer program code being configured to cause the apparatus to transmit, by the network node, verification information comprises being configured to cause the apparatus to:

transmit, by the network node, encoded information in which downlink control information has been encoded with redundancy bits associated with the active beam bit string.

20. The apparatus of claim 14, wherein the verification information comprises at least one of the following:
  information indicating a number of active beams per cell or within a cooperation area;
  information indicating a percentage or proportion of active beams, of a full set of beams or the plurality of beams, within a cell or cooperation area;
  information indicating that a set of one or more active beams, for one or more receiver devices or within a cooperation area or a cell, has not changed during or since a last time period;
  information indicating that a set of one or more active beams, for one or more receiver devices or within a cooperation area or a cell, has completely changed during or since a last time period; or
  information indicating that a particular number or a particular percentage of active beams of a full set of beams or of the plurality of beams, has changed, or has not changed, during or since a last time period.

21. The apparatus of claim 14, wherein the processor, the at least one non-transitory memory and the computer program code being configured to further cause the apparatus to:
  receive, by network node from the at least one receiver device, a measurement report to report channel state information and/or an estimated receive power for each of the active beams of the verified estimated set of one or more active beams for the user device.

22. The apparatus of claim 15, wherein the beam-specific sequence for each active beam comprises a beam-specific sequence of at least one of the following signals associated with an active beam:
  a channel state information-reference signal (CSI-RS), of a plurality of orthogonal channel state information-reference signals; or
  a coded reference signal of a plurality of non-orthogonal coded reference signals;
  a synchronization signal block (SSB);
  a demodulation reference signal (DMRS);
  a tracking reference signal (TRS); or
  a position reference signal (PRS).

* * * * *